United States Patent
Kodner et al.

(10) Patent No.: US 7,425,817 B2
(45) Date of Patent: Sep. 16, 2008

(54) APPARATUS AND METHOD FOR SWITCHING CHARGING SUPPLY OF A POWER AMPLIFIER

(75) Inventors: Lionid Kodner, Mondi'ln (IL); Isaac A. Edry, Ramat Gan (IL); Vitaliy Gurevich, Ashdod (IL)

(73) Assignee: Motorola, Inc., Schaumburg, IL (US)

( * ) Notice: Subject to any disclaimer, the term of this patent is extended or adjusted under 35 U.S.C. 154(b) by 313 days.

(21) Appl. No.: 11/320,379

(22) Filed: Dec. 28, 2005

(65) Prior Publication Data

US 2006/0103356 A1    May 18, 2006

Related U.S. Application Data

(63) Continuation of application No. PCT/EP2004/050875, filed on May 20, 2004.

(30) Foreign Application Priority Data

Jun. 30, 2003    (GB)  .................................. 0315198

(51) Int. Cl.
*H01M 10/44* (2006.01)
*H01M 10/46* (2006.01)
(52) U.S. Cl. ..................................... 320/150

(58) Field of Classification Search ................. 320/108, 320/112, 150, 159, 160, 162
See application file for complete search history.

(56) References Cited

U.S. PATENT DOCUMENTS 5,477,858 A * 12/1995 Norris et al. ................. 600/441

* cited by examiner

*Primary Examiner*—Edward Tso
(74) *Attorney, Agent, or Firm*—Anthony P. Curtis

(57) ABSTRACT

A method and apparatus of controlling battery charging of an RF power amplifier are disclosed. The RF power amplifier is supplied by the battery when charging is progressing normally, but switches supply to the charger if the charging process is interrupted. A thermal detector detects a threshold temperature in the battery. A power controller provides feedback to a charger. The charger output is regulated in response to the battery feedback and the charging is suspended when the battery temperature exceeds the threshold temperature. After the charging is suspended, the charger output is regulated to maintain a minimum output voltage. Using a signal from logic circuitry, if charging has been suspended a first switching means disconnects the negative terminal of battery from ground and a second switching means connects the RF power amplifier to the charger.

11 Claims, 4 Drawing Sheets

-PRIOR ART-

-PRIOR ART-

APPARATUS AND METHOD FOR SWITCHING CHARGING SUPPLY OF A POWER AMPLIFIER

This application is a continuation of International Application No. PCT/EP2004/050875. filed May 20, 2004, which claims priority to Great Britain Application No. 0315198.2, filed Jun. 30, 2003.

TECHNICAL FIELD

The invention relates to an apparatus and method for power distribution. In particular, it relates to the distribution of power during the process of charging a lithium-ion battery.

BACKGROUND

In portable electronic devices it is desirable to have a rechargeable battery with a high energy density, to extend operation life and reduce weight.

Several rechargeable battery chemistries exist, such as those based on Nickel Metal Hydride (NiMH) and Lithium Ions (LiIon). These chemistries have differing advantages and disadvantages:

Compared with NiMH batteries, Lithium Ion batteries suffer less from memory effects (where repeated partial discharging reduces capacity), and their capacity is also less temperature dependent. Lithium Ion batteries also exhibit a lower self-discharge rate, making storage easier.

However, Lithium Ion batteries take up to twice as long to recharge as NiMH batteries, and the procedure required to stably recharge Lithium Ion batteries is more proscriptive.

A Lithium Ion battery often comprises a number of cells, but can comprise just one. The cell consists of a carbon-based negative electrode and a lithium transition metal oxide positive electrode. The basic electrochemistry of a Lithium Ion cell involves the transfer of lithium ions between these two insertion electrodes.

Upon charging, lithium ions are extracted from the positive electrode material and inserted into the negative electrode material. Upon discharging, the reverse process takes place.

If charge and discharge currents and battery temperature are properly controlled, Lithium Ion batteries are safe. However, overcharging can convert the lithium oxide into metallic lithium, which is potentially dangerous.

Due to this sensitivity to charging conditions, battery manufacturers have developed 'intelligent' batteries. These incorporate sensors and electronics to monitor cell voltage, temperature and charge or discharge current.

Intelligent batteries are used in conjunction with intelligent charging systems to implement strict guidelines in charge procedures, wherein cells are charged to 4.20V/Cell with a tolerance of ±0.05V/cell.

FIG. 1 shows the cell voltage and charge current characteristics as the Lithium-ion cell passes through three stages of charging in a known procedure.

In stage 1, a constant charge is applied (dependant on cell size) until the cell voltage limit (4.2V/Cell) is reached.

At this point, the cell is 70-80% charged.

In stage 2, the cell voltage is maintained whilst the charge current starts to drop as full cell charge is approached. A full cell charge is attained once the charge current drops below a threshold percentile of the stage 1 charge current, or the charge current levels off. In stage 3 (storage), because Lithium-ion cells cannot accommodate overcharging, an occasional top-up charge is applied in lieu of a trickle charge, typically when the open terminal voltage drops below 4.05V/Cell.

However, as noted previously, temperature is an additional factor affecting the charging process. The charging temperature of Lithium Ion batteries is limited to approximately a +45° C. maximum. If this temperature is exceeded, the battery cannot charge and charging must be suspended.

An implementation of a prior art intelligent charging system to implement the above charging regime is shown in FIG. 2.

In FIG. 2, the battery pack 250 is connected at point 208 to the 'battery' pin of the Global Control/Audio/Power controller (GCAP) 240 or equivalent and at point 204 to both the radio frequency power amplifier (RFPA) 220 and the portable device 210 via P-Channel MOSFET switch 274.

When the portable device 210 is turned on, GCAP controls the P-Channel MOSFET switch 274 between the battery and output B+ 212 from its 'Main_FET' output pin 244.

When a charger 260 is connected and recognised by GCAP 240, the 'Main_FET' output 244 causes switch 274 to disconnect the battery from the portable device 210, and an external voltage is supplied to the device via the EXT_B+ pin 216 at point 201, through voltage protection circuits (not shown) and diode 272.

To charge, GCAP 240 controls the charging current using the P-Channel MOSFET 284 and an internal digital-to-analogue converter (not shown). The charger maintains a voltage of 1.4V plus the voltage on the battery feedback line connected to the BFDBK pin 242 of GCAP 240, within limits of 4.4V and 6.5V as defined in Table 1 below:

TABLE 1

| | charging scheme | |
|---|---|---|
| Battery feedback, V | Voltage Ext_B+ | Tolerance |
| 0.0-3.0 Volts | 4.4 Volts | ±5% |
| 3.0-5.1 Volts | Battery feedback + 1.4 V | ±5% |
| 5.1+ Volts | 6.5 Volts | +2%, −5% |

The maximum mean charge current is limited to 1.5 Amps, whilst allowing charge spikes of up to 2.4 Amps to allow for RF power amplifier current requirements during transmission.

If the battery temperature exceeds approximately 45° C. then charging of the battery is suspended. However, due to the circuit arrangement of FIG. 2, drain on the battery from RF power amplifier 220 may continue. This has the potential to fully discharge the battery and consequently prevent the device operating.

The alternative is to force the device to switch off whenever the battery heats above 45° C., which may be extremely inconvenient.

The current solution known in the art is shown in FIG. 3. In FIG. 3, the RF power amplifier 220 derives its power from B+ 212 at point 301. Consequently, during charging RF power amplifier 220 takes power from the charger 260, with the result that it does not continue to drain the battery 250 if charging has been suspended due to battery overheat. This enables continuing operation of the device.

However, following the charging scheme for table 1, the charger voltage during stage 2 charging will be in the order of 1.4V+4.2V=5.6V. This is too high for some modern low-voltage RF power amplifiers, such as the 3V hetero-bipolar transistor (HBT), which has a maximum operating voltage of 4.8V.

As a consequence a new charging arrangement is required to accommodate modern low-voltage radio frequency power amplifiers.

The purpose of the present invention is to address the above requirement.

SUMMARY OF THE INVENTION

The present invention provides a circuit arrangement wherein in operation the radio frequency power amplifier is supplied by the battery when charging is progressing normally, but switches supply to the charger if the charging process is interrupted (typically due to extreme temperature conditions). Thus the RF power amplifier may for example receive approximately 4.2V from the battery or, in accordance with Table 1 above, approximately 4.4V±5% from the charger, if charging of the battery is suspended.

Thus the present invention enables continuing operation of the device if charging is suspended, whilst limiting the voltage level to the RF power amplifier, e.g. to approximately 4.4V±5%.

In a first aspect, the present invention provides apparatus to control a lithium-ion battery charging process, as claimed in claim 1;

In a second aspect, the present invention provides a method of controlling a lithium-ion battery charging process, as claimed in claim 11;

Further features of the present invention are as defined in the dependent claims.

Embodiments of the present invention will now be described by way of example with reference to the accompanying drawings in which:

DETAILED DESCRIPTION

Figure 1:
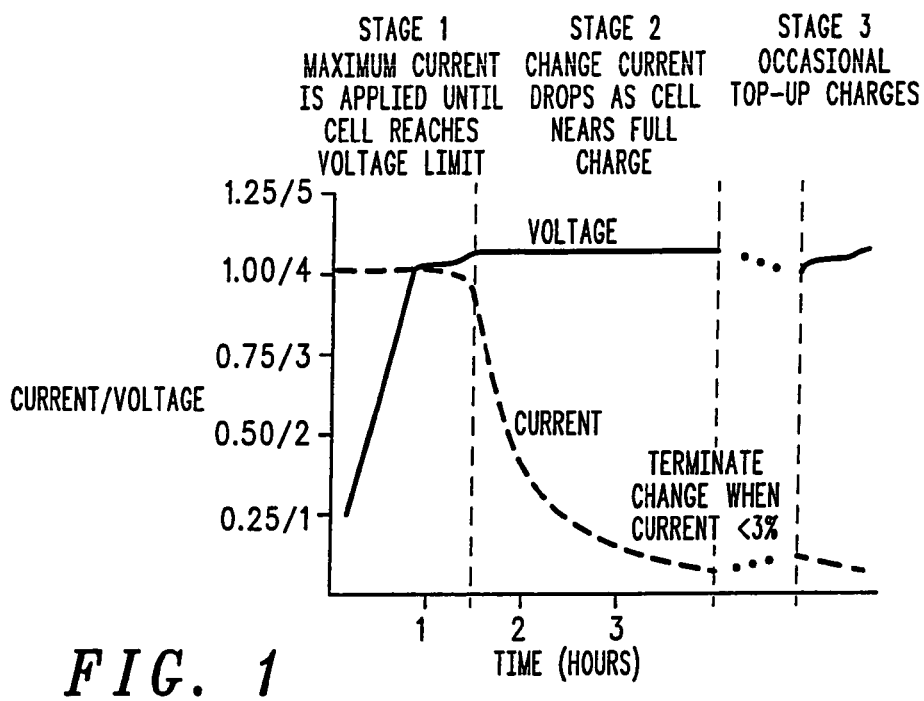
FIG. 1 is a graph of current/voltage versus time, showing the charge current and battery voltage characteristics during a typical Lithium-Ion battery charging process.
Figure 2:
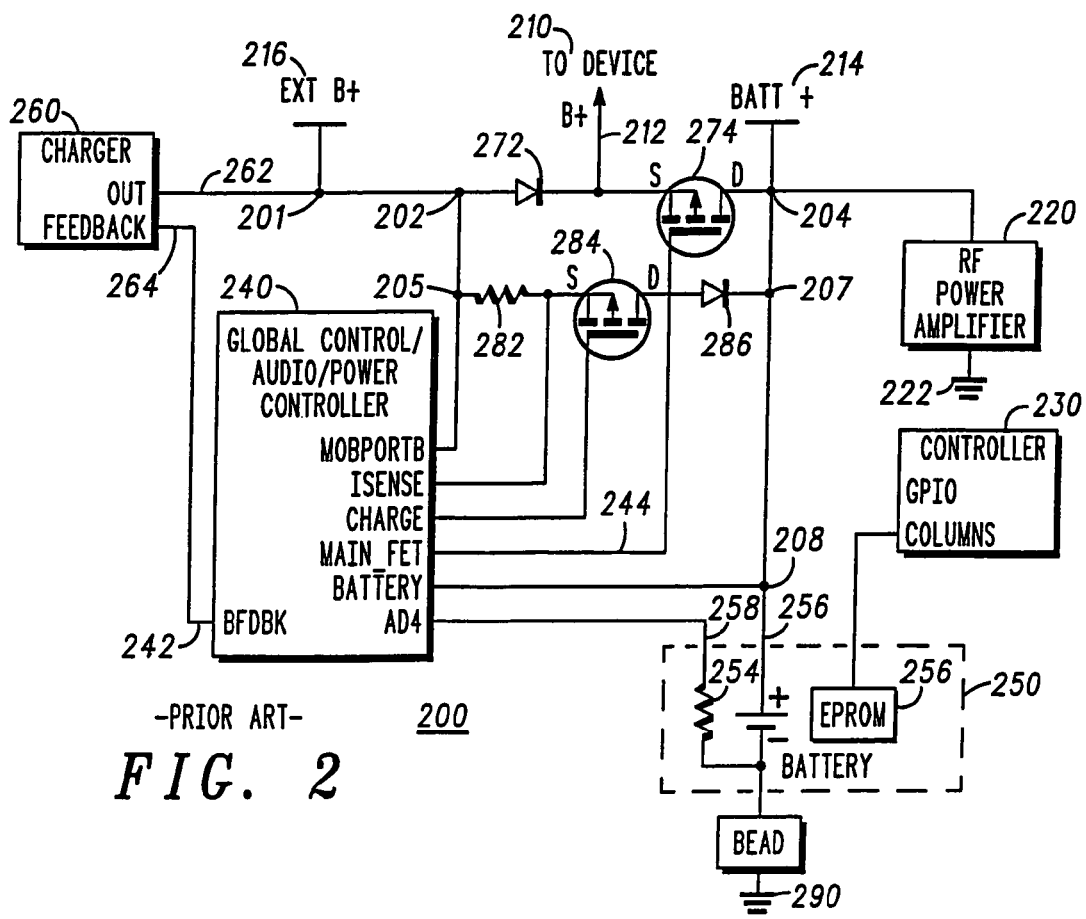
FIG. 2 is a circuit diagram showing a prior art arrangement for charging a Lithium-Ion battery.
Figure 3:
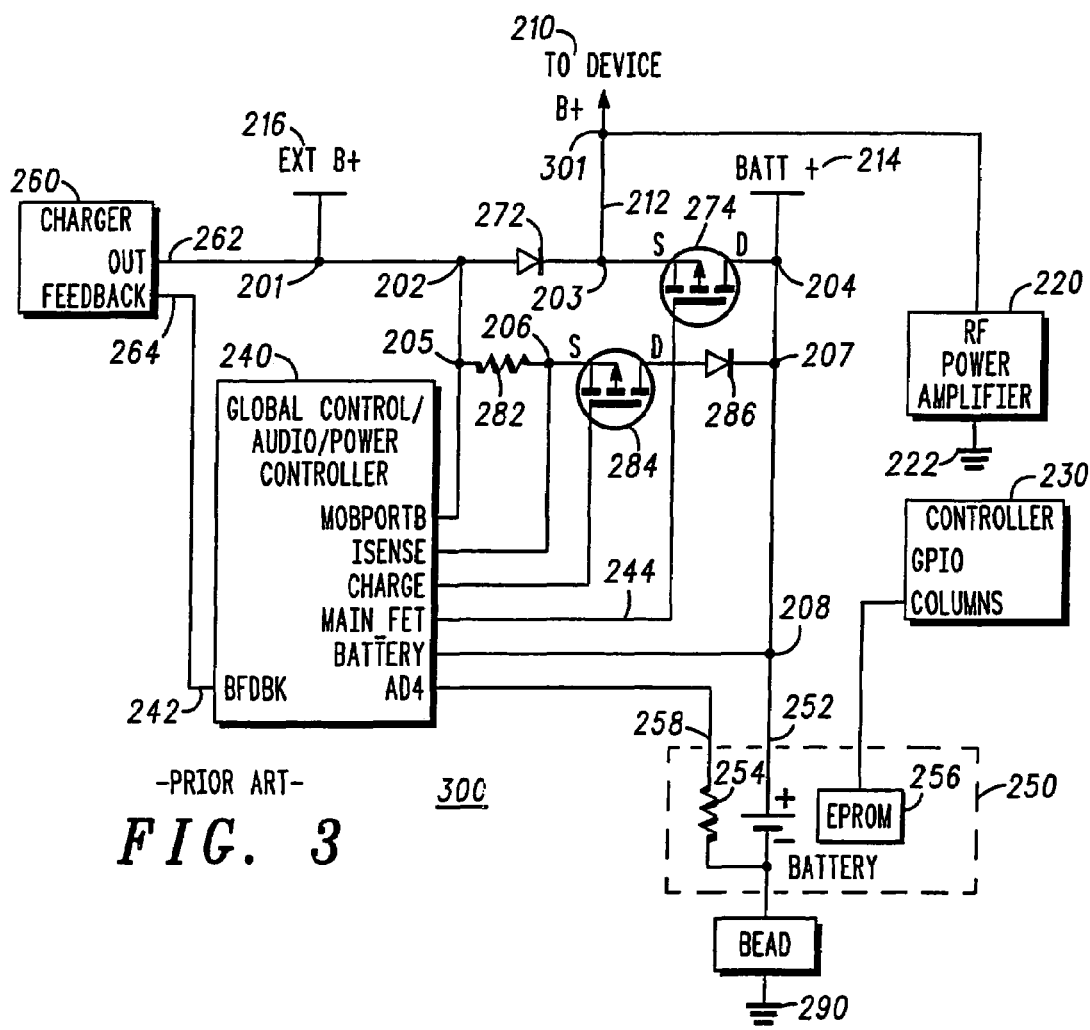
FIG. 3 is a circuit diagram showing a further prior art arrangement for charging a Lithium-Ion battery.
Figure 4:
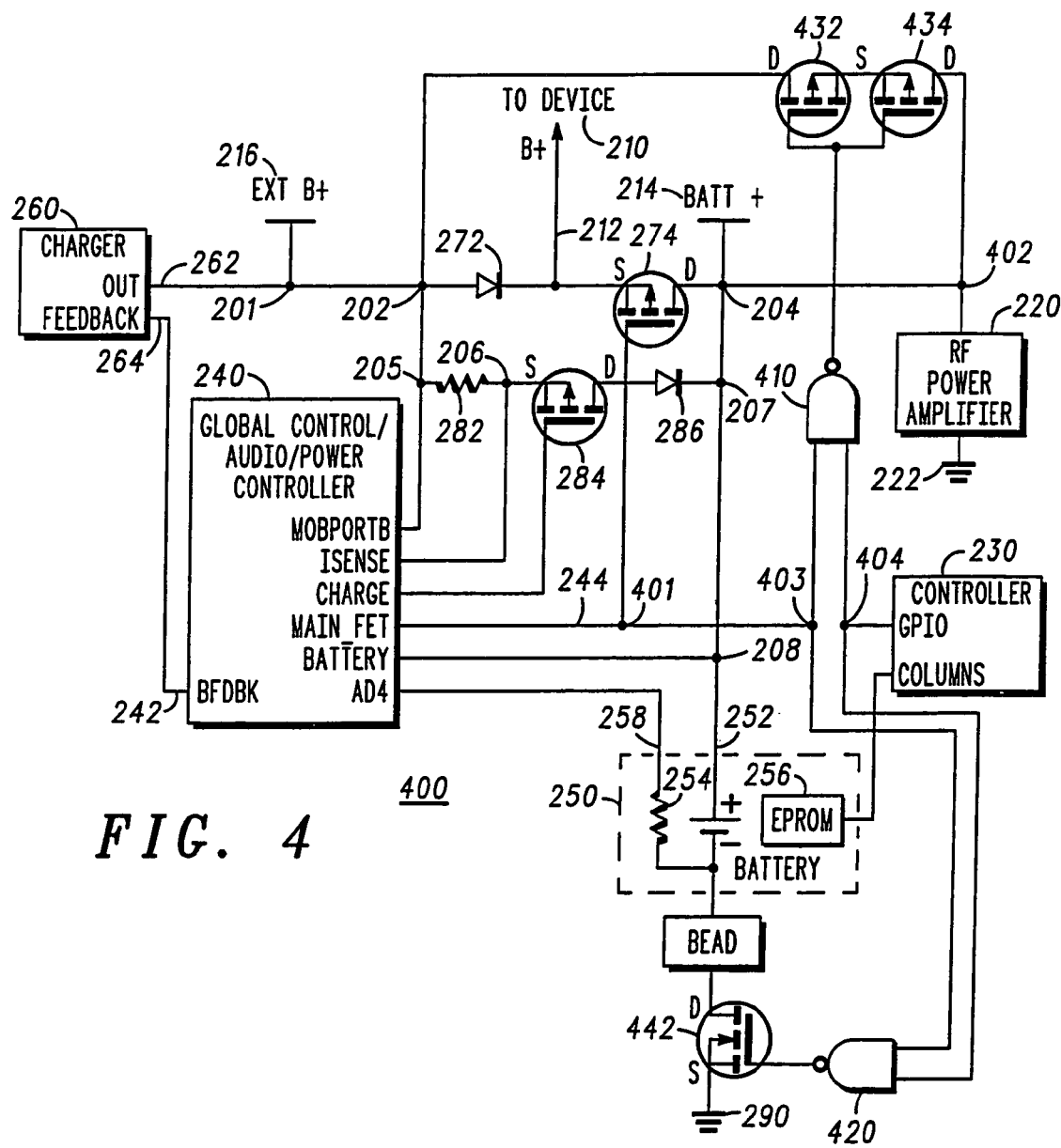
FIG. 4 is a circuit diagram showing an arrangement for charging a Lithium-Ion battery in accordance with a preferred embodiment of the present invention, limiting the voltage at the radio frequency power amplifier to a maximum of approximately 4.4V±5%.

Referring to FIG. 4, the battery pack 250 is connected at point 208 to the 'battery' pin of the Global Control/Audio/Power controller (GCAP) 240 or equivalent. The battery pack 250 is also connected at point 204 directly to the radio frequency power amplifier (RFPA) 220, and via P-Channel MOSFET switch 274 to the portable device 210, as known in the prior art.

When the portable device 210 is turned on, GCAP controls the P-Channel MOSFET switch 274 between the battery and output B+ 212 from its 'Main_FET' pin 244, as known in the prior art.

When a charger 260 is connected and recognised by GCAP 240, the 'Main_FET' pin 244 is set 'on', causing switch 274 to disconnect the battery from the portable device 210, and an external voltage EXT_B+ is supplied to the device at point 201, through optional voltage protection circuits (not shown) and diode 272, as known in the prior art.

To charge the battery, GCAP 240 controls the charging current using P-Channel MOSFET 284, in conjunction with resistor 282, diode 286 and a digital-to-analogue converter internal to GCAP 240 (not shown). The charger maintains a voltage dependent upon the battery feedback line connected to the BFDBK pin 242 of GCAP 240, within approximate limits of 4.4V and 6.5V, as known in the prior art and detailed previously in Table 1.

Thus during charging, the RF power amplifier is supplied by battery 250 at approximately 4.2V.

A preferred embodiment of the present invention enhances the above circuit as follows:

Two NAND gates 410 and 420 are connected to GCAP output 'Main_FET' 244 via points 401 and 403, and are also connected to an output 232 of device controller 230, hereinafter termed 'GPIO', at point 404.

The output of NAND 420 is connected to the gate of P-Channel MOSFET 442. MOSFET 442 lies between the negative terminal of battery 250 and ground 290.

The output of NAND 410 is connected to two P-Channel MOSFETs 432 and 434 arranged in a back-to-back configuration, the drain channel of MOSFET 432 connected to EXT_B+ at point 202 and the drain channel of MOSFET 434 connected to the RF power amplifier at point 402.

This arrangement provides a switch with a very low serial resistance, necessary due to the high current drain during RF power amplifier 220 activation. The back-to-back arrangement prevents any current leakage from the battery during normal operation. Point 402 is preferably on the source side of the diode to minimise the diode's requirement for current capacity, but this is not a necessary limitation.

If the battery heats to an extent that charging should be suspended (thermal detection means 254 detects that battery temperature exceeds typically 45° C.), the output from the battery feedback (BFDBK) output 242 of GCAP 240 shows to the charger 260 a voltage between 0V and 3V due to the internal pull-up resistor. In accordance with Table 1, the charger now provides approximately 4.4V. Additionally, device controller 230 sets output 'GPIO' 232 to 'on'.

With both GCAP 240 output 'Main_FET' 244 and controller output 'GPIO' 232 set 'on', both NAND gates 410 and 420 switch 'off'.

The resultant low potential from NAND 420 at the gate of MOSFET 442 causes it to disconnect the negative terminal of battery 250 from ground 290. This prevents the battery 250 supplying the RF power amplifier 220, so avoiding the problem of drainage from battery 250.

The low potential from NAND 410 causes the back-to-back MOSFET pair 432 and 434 to connect the RF power amplifier 220 to charger voltage EXT_B+, whose voltage of approximately 4.4V is acceptable for use with the low-voltage RF power amplifiers previously discussed.

It will be appreciated by a person skilled in the art that the output from only a single logic gate, either 410 or 420, may be used to control all three transistors 432, 434 and 442.

Figure 5:
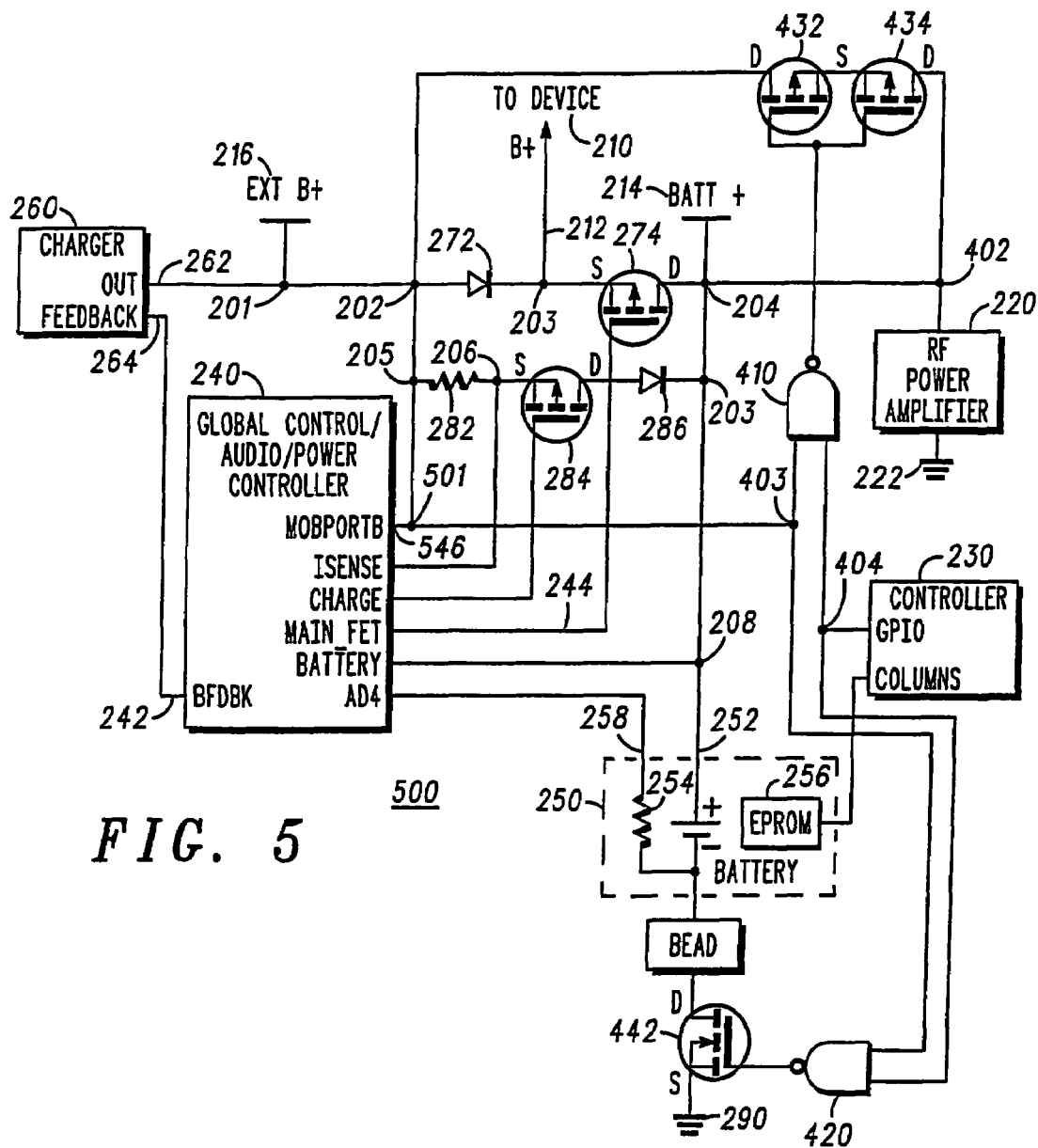
FIG. 5 is a circuit diagram showing an arrangement for charging a Lithium-Ion battery in accordance with an alternative embodiment of the present invention, limiting the voltage at the radio frequency power amplifier to a maximum of approximately 4.4V±5%.

Referring to FIG. 5, in an alternative embodiment of the present invention, the NAND gates 410, 420 are connected to output 'MOBPORTB' 546 of GCAP 240 instead of 'Main_FET' 244. When charger 260 is connected, the output of 'MOBPORTB' 546 is functionally equivalent to that of 'Main_FET' 244.

In a further alternative embodiment of the present invention, the logic circuits to provide an 'on' or 'off' state for the condition that charging is suspended are embodied within GCAP 240 and/or device controller 230.

Comparable logic arrangements to detect that charging of battery 250 is suspended are envisaged, dependent upon the nature and availability of indicators from GCAP 240 or equivalent and/or device controller 230 or equivalent.

It will be appreciated by a person skilled in the art that the above embodiments also enable operation of the device solely from the charger 260 in the physical absence of battery 250.

It will be appreciated that a person skilled in the art may use equivalent components to fulfil the same functions within the present invention, for example using N-Channel transistors rather than P-Channel transistors, according to the switching arrangements of table 2 below, or more generally, any suitable voltage operated switch.

TABLE 2

| | | | switching scheme | | | |
|---|---|---|---|---|---|---|
| | Main_FET | GPIO | P-ch FET | Logic | N-ch FET | Logic |
| Battery normal operating | 0 | 0 | Disconnect | 1 | Connect | 1 |
| Battery normal operating | 0 | 1 | Disconnect | 1 | Connect | 1 |
| Charger connected - Normal charging process | 1 | 0 | Disconnect | 1 | Connect | 1 |
| Charger connected - charging process disabled (no-battery operation) | 1 | 1 | Connect | 0 | Disconnect | 0 |

It will also be appreciated by a person skilled in the art that the roles of GCAP 240 and device controller 230 may be implemented by a single device or more than two devices.

Further details are self-evident from FIGS. 4 and 5.

The invention claimed is:

1. Apparatus to control a lithium-ion battery charging process, comprising;
    a lithium-ion battery (250);
    a power controller (240);
    a device controller (230);
    a radio frequency (RF) power amplifier (220);
    a first voltage operated switch (VOS)(274) operable to control connection between the battery (250) and device (210);
    a thermal detection means (254), operably coupled to the power controller (240);
    a battery feedback means (242) operable to couple the power controller (240) to a charger (260); and
    the charger (260) operable to respond to the battery feedback means (242), so relating charger output to battery state, wherein the charger (260) produces a default minimum output voltage in response to a suspension in battery charging when battery temperature exceeds a threshold,
    characterised by;
    logic circuitry (410, 420, 230, 240) operable to indicate that battery charging has been suspended;
    a first switching means (442) depending from said logic circuitry operable to disconnect the negative terminal of battery (250) from ground (290) if charging has been suspended;
    a second switching means (432, 434) depending from said logic circuitry operable to connect the RF power amplifier (220) to the charger (260) if charging has been suspended.

2. Apparatus according to claim 1, wherein said logic circuitry comprises at least a first NAND gate (410) operably coupled to both the input to the gate channel of a first PET (274) from the power controller (240) and to an output channel of the device controller (230), wherein:
    said input to the first VOS (274) is set 'on' whilst the charger (260) is providing a voltage, and said output channel of the device controller (230) is set 'on' in the event that battery charging is suspended.

3. Apparatus according to claim 1, wherein said logic circuitry comprises at least a first NAND gate (410) operably coupled to an output MOBPORTB (546) from power controller (240) and to an output channel of the device controller (230), wherein:
    said input to the first VOS (274) is set 'on' whilst the charger (260) is providing a voltage, and said output channel of the device controller (230) is set 'on' in the event that battery charging is suspended.

4. Apparatus according to claim 1, wherein said first switching means (442) comprises a second VOS arranged with its drain node operably coupled to the negative terminal of the battery (250), its source node operably coupled to ground and its gate node operably coupled to aforesaid logic circuitry.

5. Apparatus according to claim 1, wherein said second switching means (432, 434) comprises two additional VOSs with their source nodes connected to each other, a first drain node operably coupled to the charger, a second drain node operably coupled to the RF power amplifier and their gate nodes operably coupled to said logic circuitry.

6. Apparatus according to claim 1, wherein any or all of the VOSs are field effect transistors (FETs).

7. Apparatus according to claim 6, wherein any or all of the PETs are Metal oxide semiconductor FETs (MOSFETs).

8. Apparatus according claim 7, wherein any MOSFETs are P-channel MOSFETs.

9. Apparatus according to claim 1, wherein the default minimum voltage for the charger (260) is 4.4 V±5%.

10. Apparatus according to claim 1, wherein a suspension in battery charging is due to thermal detection means (254) detecting that the battery (250) temperature has exceeded approximately 45° C.

11. A method of controlling a lithium-ion battery charging process, the method comprising;
    using a thermal detection means (254) to detect a threshold temperature in the battery (250);
    using a power controller (240) top provide battery feedback via a battery feedback means (242) to a charger (260);
    regulating the output of the charger (260) in response to the battery feedback; and
    suspending charging of the battery (250) when the battery temperature exceed a threshold,
    characterized by;
    indicating by logical operation that battery charging has been suspended;
    upon suspension, regulating the charger output to maintain a default minimum output voltage;
    switching, in dependence from said logical operation, of a first switching means (442) to disconnect the negative terminal of battery (250) if charging has been suspended; and
    switching, in dependence from said logical operation, of a second switching means (432, 434) to connect RF power amplifier (220) to charger (260) if charging has been suspended.

* * * * *